H. MÜLLER.
Improvement in Stop Cocks.

No. 120,311. Patented Oct. 24, 1871.

Witnesses:
E. Wolff
Francis McArdle

Inventor:
H. Müller
per Munn & Co.
Attorneys.

UNITED STATES PATENT OFFICE.

HERMANN MÜLLER, OF VIENNA, AUSTRIA, ASSIGNOR TO FRANCIS TELBINGER, OF SAME PLACE.

IMPROVEMENT IN STOP-COCKS.

Specification forming part of Letters Patent No. 120,311, dated October 24, 1871.

*To all whom it may concern:*

Be it known that I, HERMANN MÜLLER, of Vienna, in the Empire of Austria, have invented certain Improvements in Stop-Cocks, of which the following is a specification:

My invention consists in the improvement of double valves, as hereinafter fully described and subsequently pointed out in the claims.

Figure 1:
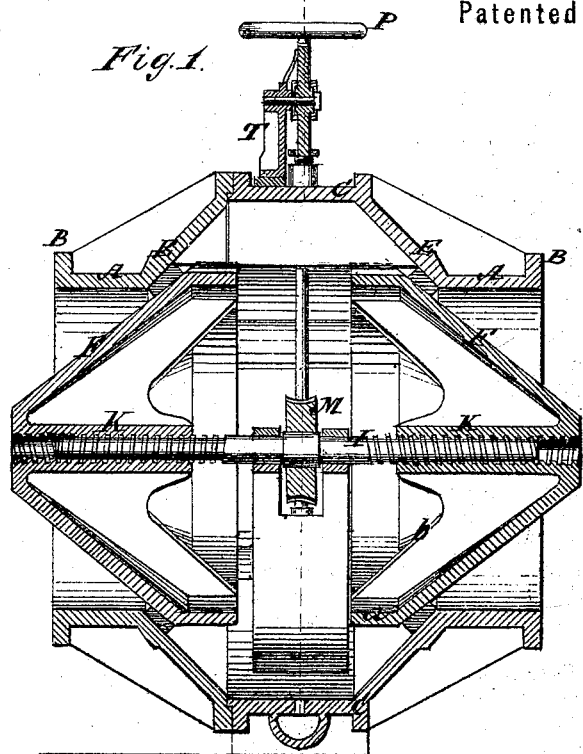
Figure 2:
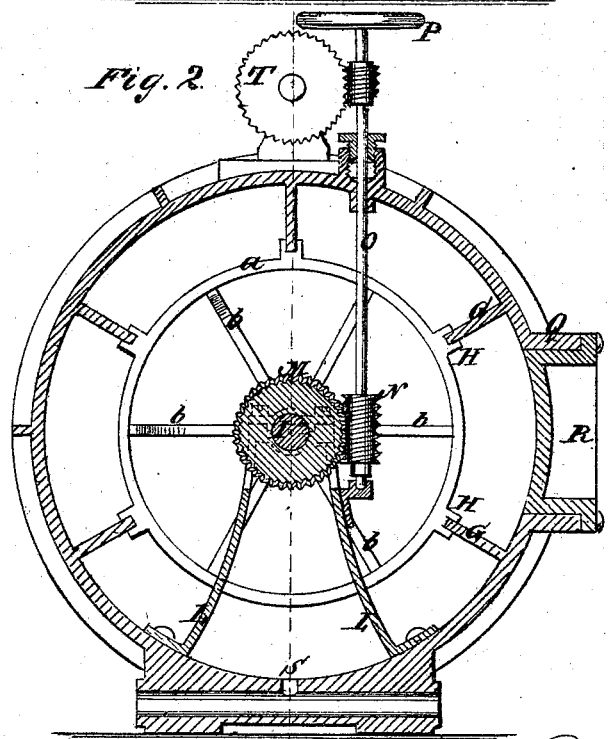

Figure 1 is a longitudinal sectional elevation of my improved stop-cock taken on the line $x\ x$.

Similar letters of reference indicate corresponding parts.

A represents the two end sections of the valve-box or case, which are to be of the same size that the pipes are to which the box is to be connected, the said connections being made at the flanges B. C is the enlargement of the said case; E, the valve-seats; F, the valves; G, the guides radiating from the interior of the case; H, grooved ribs on the valves fitted to said guides; I, the right-and-left threaded screw; K, a screw-threaded hub in the axis of each valve in which the screw works; L, a stand bolted to the interior of the box and supporting the screw; M, a worm-wheel on the screw; N, a worm on the end of a shaft, O, and gearing with the worm-wheel, said shaft extending through the case to the exterior; P, a hand-wheel at the outer end for turning it. Q is an opening in the side of the box, and R a cap for closing said opening water-tight. S is a vent at the bottom for the escape of the water between the valves when the latter are closed and it is desired to open the case to inspect the valves. This vent may be closed by a small cock or plug to prevent the escape of the water when it is not required to open the case. A dial-wheel or disk, T, is geared with the shaft O, and provided with a pointer to indicate the extent the valves are opened or the quantity of water the valves will pass at any given opening.

It is manifest that by turning the hand-wheel P in one direction the valves will be opened, and in the other they will be closed.

The conical form of the valves and seats is preferable to any other, as they wedge together under the action of the screw tighter than they would in other form. The said valves have a cylindrical base, $a$, joined on the base of the cone, and are made hollow, both the cylinder and cone, with strengthening-ribs $b$, which connect the said parts with the nut or screw-threaded sleeve K, making a light and strong valve, considerably cheaper than if made solid.

Having thus described my invention, I claim as new and desire to secure by Letters Patent—

1. The construction of a double valve with grooved radial ribs H and axial hubs K K arranged in cavities thereof, as and for the purpose specified.

2. Two internal aligned and internally-threaded hubs, K K, of a two-part valve, F F, combined with a right-and-left screw, I, centrally swiveled, and passing through the axis of each cone so as to regulate the extent of opening in the valves, as described.

3. The combination, with a swiveled right-and-left screw, I, moving the hubs K K of a double valve on the ends thereof, of a worm-wheel, M, double worm-shaft O P, and dial-wheel T, whereby the spacing of the valves apart can be adjusted with absolute exactitude.

4. The combination, with a two-part valve, F F, of a raised valve-case, C E, provided with a removable cap, R, fitted water-tight into an opening, Q, as and for the purpose specified.

5. A stop-cock, provided with conical valves, arranged and operating substantially as herein shown and described, whereby the pipes may be closed and access given to the interior of the stop-cock without emptying the pipes.

Vienna, July 24, 1871.

HERMANN MÜLLER.

Witnesses:
L. PALLANDT,
MATHIAS BARTHMEN. (167)